Patented Oct. 24, 1939

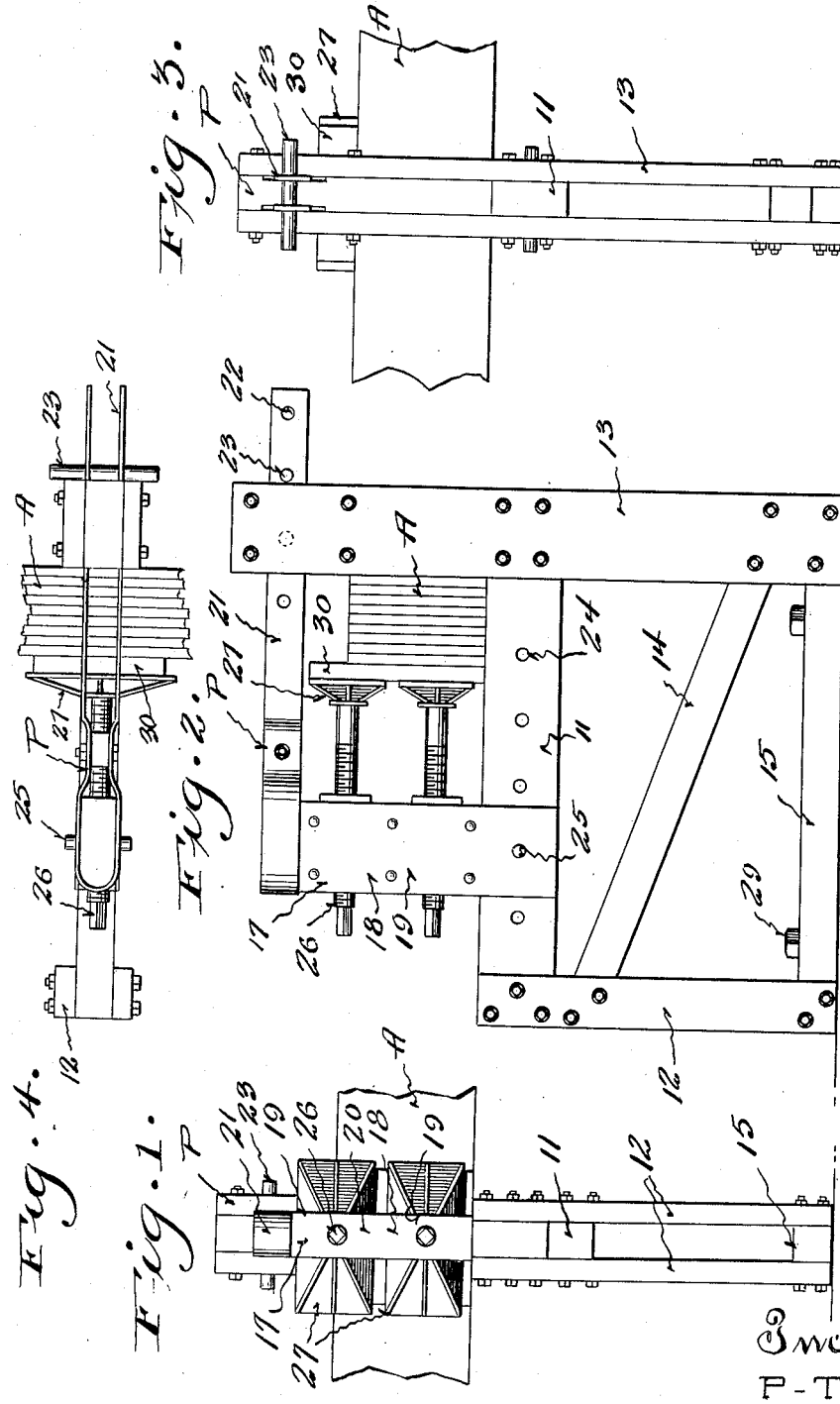

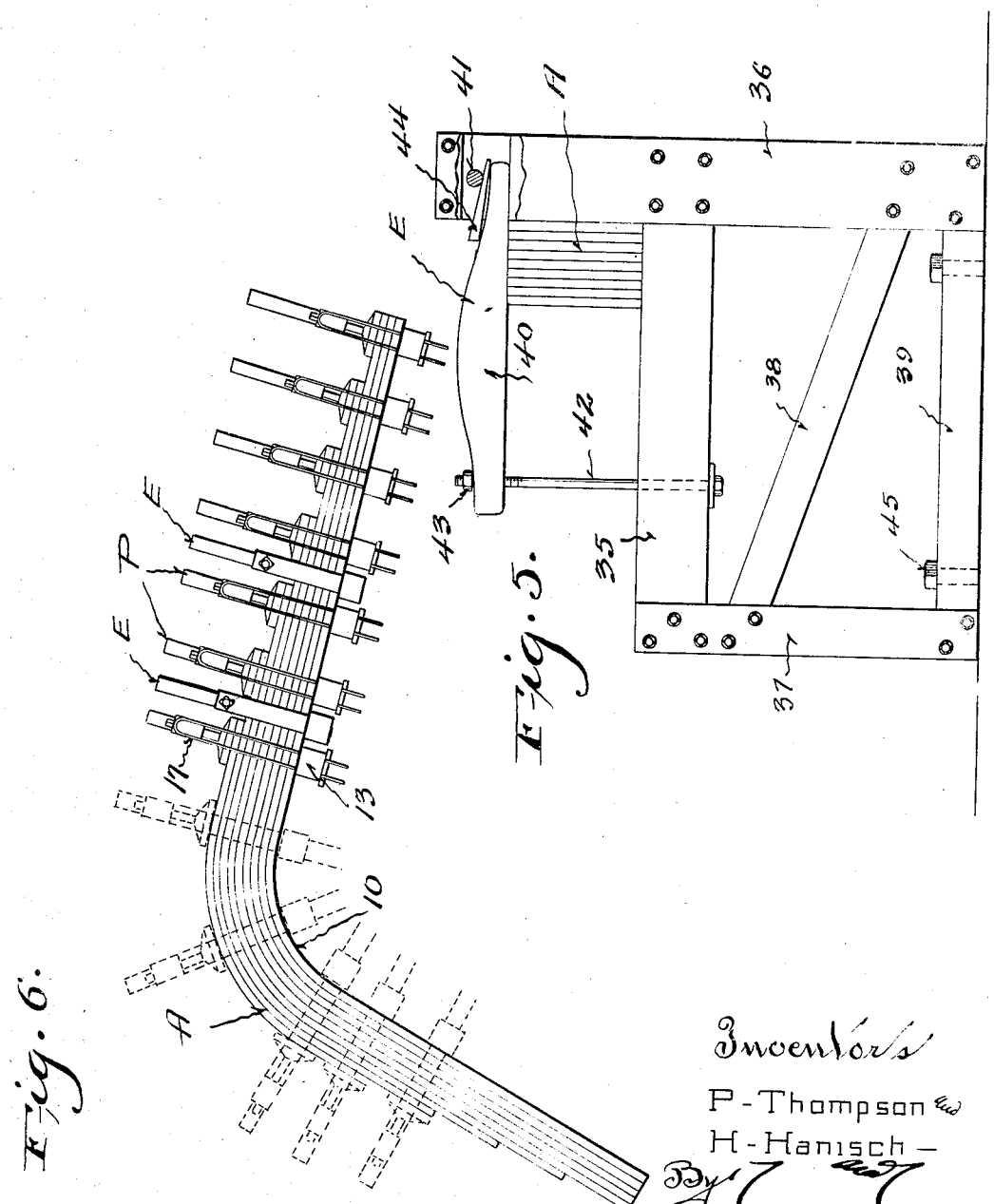

2,177,395

UNITED STATES PATENT OFFICE 2,177,395

FORM JACK FOR MANUFACTURING BUILDING ARCHES

Peter Thompson and Herbert Hanisch, Peshtigo, Wis., assignors to Unit Structures, Inc., Peshtigo, Wis., a corporation of Wisconsin Application September 12, 1936, Serial No. 100,448

1 Claim. (Cl. 144—289)

This invention appertains to a novel device for forming laminated members of the type shown in our co-pending application Serial No. 100,447, filed September 12, 1936, now Patent No. 2,172,093, dated September 5, 1939, and entitled Building arches and process of manufacturing the same.

One of the primary objects of our invention is the provision of novel form jacks or presses, which can be arranged in any desired formation for exerting an even and continuous pressure throughout the length of a laminated beam or arch during the fabrication thereof, for holding the laminae of the arch or beam in even contact irrespective of the length or curvature of the beam or arch.

Another salient object of our invention is the provision of novel means for forming a laminated curved arch or beam embodying a plurality of movable form jacks or press members, which can be disposed on any arc of a circle relative to one another to receive the beam or arch during the bending thereof, with novel means for holding the boards of the laminations in proper relation during the pressing together of the boards.

A further object of our invention is the provision of a novel device for forming laminated beams or arches embodying a plurality of movable members adapted to be anchored to the floor of a factory in any preferred relation according to the character of the beam or arch being constructed, each of said members including a support for receiving the laminae or boards of the beam or arch, and bodily shiftable means for initially holding the boards or laminae in their bent condition, having pressure-exerting means for urging the laminae in continuous and even contact.

A further important object of our invention is the provision of a plurality of press or form jacks for urging the boards or laminae into facial contact, and a plurality of members for initially urging the boards or laminae into even edge relation.

A still further object of our invention is to provide a novel device for forming laminated beams or arches, which will be durable and efficient in use, and which will be simple and easy to manipulate.

With these and other objects in view, the invention consists in the novel construction, arrangement, and formation of parts, as will be hereinafter more specifically described, claimed, and illustrated in the accompanying drawings, in which drawings:

Figure 1 is a rear end elevation of one of the improved jacks or form presses showing the same in use.

Figure 2 is a side elevation of one of the jacks or form presses, showing the same in use.

Figure 3 is a front end elevation of one of the novel jacks.

Figure 4 is a top plan view of the same.

Figure 5 is a side elevation of one of the devices utilized for holding the boards or laminae in an even relation during the pressing thereof.

Figure 6 is a diagrammatic view showing the arch in the course of fabrication, with the improved jacks or form presses and board eveners in use.

Referring to the drawings in detail, wherein similar reference characters designate corresponding parts throughout the several views, the letter A generally indicates an arch or other laminated member being fabricated, P the novel form jacks or presses for urging the boards or laminae in even facial contact, and E the members for evening up the boards or laminae with their edges in the same plane.

As described in our above mentioned co-pending application a plurality of boards or laminae 10 are selected, and these boards have their adjacent faces thoroughly coated with a suitable adhesive. As shown in Figure 6, the boards can progressively decrease in length toward one face of the arch, and the assembled boards or laminae are all evened up so that their edges will be in the same plane by the evening members E. The assembled boards are bent and held in their proper curved position by the novel form jacks or presses P.

Each of the form presses or jacks P include a horizontal table or support 11 on which the boards or laminae can be assembled. The table or support 11 has rigidly bolted thereto rear supporting legs or standards 12, and front supporting legs or standards 13. These legs or standards 12 and 13 can be braced by a diagonal strut 14, and by a bottom brace bar 15. The front supporting legs or standards 13 extend a considerable distance above the table or supporting bar 11, and the inner edges of the standards 13 constitute an abutment against which the inner face of the beam or arch is adapted to abut.

Mounted for adjustable movement longitudinally of the table or supporting bar 11 is the L-shaped clamping member 17, which embodies a vertically disposed post 18. This post can include side metal plates 19 for straddling the sides of the table or supporting bar 11, and a filler block 20 for resting on top of the table or supporting bar. Extending forwardly from the post 18 is the horizontally disposed portion 21 of the clamping member, which can be formed from a U-shaped piece of strap iron or similar metal. The U-shaped strap member is bent around the upper end of the post and extends forwardly therefrom and between the upper ends of the standards 13. This U-shaped strap 21 is provided with a plurality of equi-distantly spaced openings 22, and a holding pin 23 is adapted to be received in a pair of the selected openings 22, and bear against the front edge of the standards 13. The table or supporting bar 11 is likewise provided with a plurality of spaced openings 24, and the metal plates 19 have formed therein openings 25 which are adapted to register with a selected opening 24. A removable pin is adapted to be placed through the openings 25, and the selected opening 24, to hold the adjustable member 17 in its initial adjusted position. One or more jack screws 26 are threaded into the post 18, and the forward ends of these jack screws have swivelly secured thereto bearing heads 27. The rear ends of the jack screws are of a polygonal formation in cross section so that the screws can be readily turned by a wrench, or the like.

In use of the improved form jacks or presses P, the same are arranged in the desired formation according to the curvature of the beam or arch to be fabricated. Any desired means can be employed for rigidly anchoring the presses in position against movement, and, as shown, we can utilize heavy screws or spikes 29, which are inserted through the lower rails 15 of the presses P, and into the floor of the factory. The assembled boards are placed on the table or supporting bars 11 adjacent to one end, and clamped in such position by moving up the adjustable members 17. The opposite end of the beam or arch A is then gradually bent into the desired curvature by any desired means. As the beam is bent the adjustable members 17 are placed over the beam or arch, and are held in an adjusted position by the pins 23 and 25. Upon continuing the bending of the beam or arch, the members 17 are slid toward the standards 13, and after the arch reaches its approximate shape, the jack screws of all of the members are then tightened, so that the boards or laminae will be brought into continuous and firm contact with one another, and so that the arch will be made to assume its desired form.

In actual practice, a pattern of the exact shape is cut out from any desired material, and the pattern can either be laid on the floor, or on top of the presses. This pattern forms the guide for facilitating the bending of the beam or arch into the exact shape, and also forms a means to show how much the beam or arch will have to be trimmed off after all of the boards or laminae are secured together.

As shown in Figures 1 to 3, inclusive, presser plates 30 can be placed between the heads 27 and the beam or arch being formed.

It is desirable and essential to provide means for evening up the boards so that all of their edges will lie in the same plane. This is done before pressure is applied to the beam or arch, and, hence, when the boards are selected and piled on the tables or supporting bars 11, and the same are turned so that the boards or laminae will be disposed in their vertical plane, the eveners E are brought into play, and can be placed between selected pressers P. The eveners E are constructed similar to the pressers P, and thus each evener includes a supporting bar or table 35 having front and rear pairs of supporting legs or standards 36 and 37 rigidly bolted thereto. The front standards 36 extend a material distance above the table or supporting bar, and form an abutment for the boards of the arch or beam. The front and rear standards 36 and 37 can be suitably braced by a diagonal strut 38, and a bottom rail 39.

Arranged above the table or supporting bar 35 is a presser beam or leveler 40. The front end of the beam 40 is inserted between the front standards 36, and is adapted to bear against a cross pin 41 connected to said standards. An adjusting screw 42 extends through the table 35, and through the evener or presser beam 40. An adjusting nut 43 can be threaded on the bolt so as to form means for urging the beam 40 downwardly into intimate contact with the upper edges of the boards or laminae. A wedge block 44 can be driven in between the beam 40, and the pin 41, to facilitate the moving down of the beam. Heavy spikes or screws 45 may be utilized for rigidly securing the eveners E to the floor, and, as shown, these screws or spikes extend through the bottom rails 39, and into the floor.

From the foregoing description, it can be seen that we have provided a novel and simple means for facilitating the forming of laminated beams or arches.

Changes in details may be made without departing from the spirit or scope of our invention, but what we claim as new is:

In a device facilitating the fabrication of laminated beams and arches, a form press comprising a supporting bar on which the laminae of the beam or arch are placed, front and rear supporting standards for the bar, the front standards extending above said bar to form an abutment for the laminae, an L-shaped adjusting member movable towards and away from the abutment longitudinally of the bar, means for adjustably securing the L-shaped member to the bar and front standards, and jack screws adjustably carried by the L-shaped member and movable towards and away from the abutment.

PETER THOMPSON.
HERBERT HANISCH.